United States Patent [19]

Hatsuno et al.

[11] 4,269,061
[45] May 26, 1981

[54] LEAKAGE SENSOR APPARATUS FOR FLUID PASSAGEWAY

[75] Inventors: Hiroshi Hatsuno; Toshio Machida; Mitsuo Fukushima; Shinji Ogawa, all of Higashi Matsuyana, Japan

[73] Assignee: Diesel Kiki Co., Ltd., Tokyo, Japan

[21] Appl. No.: 30,231

[22] Filed: Apr. 16, 1979

[30] Foreign Application Priority Data

Apr. 24, 1978 [JP] Japan .................. 53-48419

[51] Int. Cl.³ ............................. G01M 3/26
[52] U.S. Cl. ........................................... 73/40
[58] Field of Search ................. 73/40, 49.2, 49.7

[56] References Cited

U.S. PATENT DOCUMENTS

| | | | |
|---|---|---|---|
| 3,800,586 | 4/1974 | Delatorre et al. | 73/49.2 |
| 3,874,225 | 4/1975 | Fegel | 73/40 |
| 4,078,421 | 3/1978 | Gastaldo et al. | 73/49.2 |
| 4,172,477 | 10/1979 | Reich | 73/49.2 X |
| 4,197,531 | 4/1980 | Wentworth, Jr. | 73/40 X |

*Primary Examiner*—Gerald Goldberg
*Assistant Examiner*—Joseph W. Roskos
*Attorney, Agent, or Firm*—David G. Alexander

[57] ABSTRACT

A fluid pressure passageway (14) such as a high pressure fuel line in a fuel injection system is pressurized to an upper predetermined value. Then, the passageway (14) is isolated and the length of time for the pressure to drop to a lower predetermined value is measured. The greater the degree of leakage, the shorter the measured length of time. An alarm (24) is energized when the measured length of time is shorter than a predetermined length of time.

12 Claims, 5 Drawing Figures

LEAKAGE SENSOR APPARATUS FOR FLUID PASSAGEWAY

BACKGROUND OF THE INVENTION

The present invention relates to an apparatus for measuring the degree of leakage from a fluid pressure passageway. The invention may be utilized in fuel injection systems for automotive engines, air conditioning systems, hydraulic power systems and the like.

It has been known in the art to measure the leakage from, for example, a high pressure supply line for an engine fuel injection system using a Bourdon tube apparatus. A fluid pressure source is connected to the line after which time the line is isolated by means of a valve. The time required for the pressure in the line to drop from one value to a lower value is measured. This value corresponds to the degree of leakage. The greater the degree of leakage, the shorter the length of time required for the line pressure to drop from a high value to a lower value.

This method of measuring the amount of leakage cannot be considered entirely satisfactory. Generally, a Bourdon tube apparatus provides an unstable indication and is extremely sensitive to temperature variations which change the reading. Although it is possible to convert the output of a Bourdon tube to an electrical signal, the electrical components required for such conversion are also sensitive to temperature variations.

Probably the most serious drawback of the prior art system is that the method is basically inaccurate and the results vary considerably depending on the person taking the measurement. It is also hard to standardize the measurement procedure and properly train personnel to take the measurements.

SUMMARY OF THE INVENTION

An apparatus embodying the present invention for measuring a degree of leakage from a fluid passageway comprises pressure sensor means connected to the passageway for producing a sensor electric signal corresponding to fluid pressure in the passageway, pressure source means for applying fluid pressure of an upper predetermined value to the passageway, valve means for disconnecting the pressure source means from the passageway when the pressure reaches the upper predetermined value, comparator means responsive to the sensor means for comparing the sensor signal with a reference electric signal corresponding to a lower predetermined value of fluid pressure in the passageway, and timer means responsive to the comparator means for measuring a length of time for the sensor signal to equal the reference signal after the valve means disconnects the pressure source means from the passageway.

In accordance with the present invention, a fluid pressure passageway such as a high pressure fuel line in a fuel injection system is pressurized to an upper predetermined value. Then, the passageway is isolated and the length of time for the pressure to drop to a lower predetermined value is measured. The greater the degree of leakage, the shorter the measured length of time. An alarm is energized when the measured length of time is shorter than a predetermined length of time.

It is an object of the present invention to provide a leakage sensor apparatus for sensing an amount of leakage from a fluid passageway in a reliable and accurate manner.

It is another object of the present invention to provide a leakage sensor apparatus which provides efficient and accurate readings which are immune to operator error.

It is another object of the present invention to provide a generally improved leakage sensor apparatus for a fluid passageway.

Other objects, together with the following, are attained in the embodiment described in the following description and shown in the accompanying drawing.

DESCRIPTION OF THE PREFERRED EMBODIMENT

While the leakage sensor apparatus of the invention is susceptible of numerous physical embodiments, depending upon the environment and requirements of use, substantial numbers of the herein shown and described embodiment have been made, tested and used, and all have performed in an eminently satisfactory manner.

Figure 1:
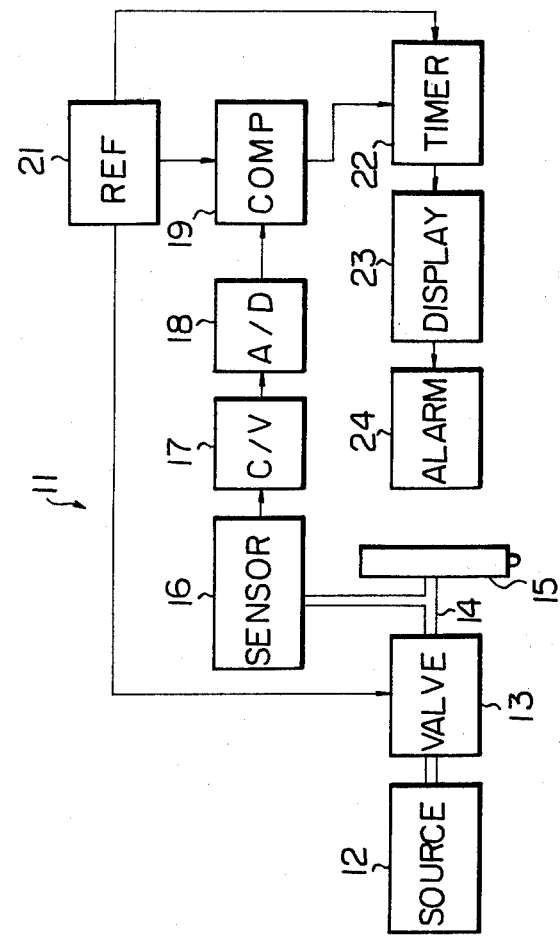
FIG. 1 is a block diagram of a leakage sensor apparatus embodying the present invention.

Referring now to FIG. 1 of the drawing, a fluid leakage sensor apparatus embodying the present invention is generally designated by the reference numeral 11 and comprises a source 12 of pressurized fluid. Depending on the application, the source 12 may produce air at positive gage pressure (pressurized air), air at negative gage pressure (vacuum), pressurized refrigerant fluid, pressurized hydraulic fluid or oil, pressurized fuel or the like. The source 12 is connected through an electrically controlled valve 13 to a passageway 14 from which the fluid leakage is desired to be measured. A fuel injector 15 is illustrated as being connected to the passageway 14. The fuel injector 15 injects fuel supplied thereto from a pump (not shown) through the passageway 14 into an engine (not shown). For testing the leakage from the passageway 14, the pump is de-energized and preferably disconnected from the passageway 14. In such an application, the source 12 is selected to supply fuel at high pressure into the passageway 14.

In accordance with the present invention, a pressure sensor 16 is connected to the passageway 14 to sense the magnitude of pressure therein. Preferably, the sensor 16 comprises an electrically conductive diaphragm which is movable relative to another electrically conductive diaphragm to an extent corresponding to the fluid pressure in the passageway 14. The electrical capacitance between the two diaphragms varies as a function of the distance therebetween which in turn is a function of the pressure in the passageway 14. The sensor 16 is constructed to produce an electrical current which corresponds to, and is preferably proportional to, the pressure in the passageway 14. A sensor which operates on these principles and which may be utilized as the sensor 16 is manufactured by the Ohkura Electric Company, Ltd. of Japan and is designated as ALPHALINE Model 1151GP. This particular sensor produces an output current ranging from 4–20 mA in response to input pressures ranging from 0–127 mmH$_2$O. The range of diaphragm movement in this sensor is 0–0.1 mm.

The output of the sensor 16 is fed to a current to voltage converter 17 which produces an output voltage proportional to input current. This voltage corresponds to the pressure in the passageway 14.

The output of the current to voltage converter 17 is connected to an analog to digital converter 18 which produces an electric digital sensor signal, consisting of a number of parallel bits, which corresponds to the pressure in the passageway 14. This digital signal is applied to an input of a digital comparator 19.

The comparator 19 is connected to a reference or control unit 21 which has an output connected to control the valve 13. Outputs of the comparator 19 and reference unit 21 are connected to a timer 22. The output of the timer 22 is connected to an input of a display unit 23. The output of the display unit 23 is connected to an alarm 24.

In operation, the valve 13 is opened by the reference unit 21, thereby applying high pressure fluid to the passageway 14. The reference unit 21 applies a digital high pressure signal to the comparator 19 which corresponds to a high predetermined pressure P1. When the measured or sensed pressure equals the pressure P1, the comparator 19 feeds a first output signal to the reference unit 21 which closes the valve 13. This isolates the passageway 14 from the source 12 and from the rest of the environment except for leakage paths.

The reference unit 21 may be constructed to open the valve 13 in either of two ways. The first way is to initially connect the source 12 to the passageway 14. The pressure in the passageway 14 will not rise to the pressure of the source 12 instantaneously, but will do so over a period of time, however short. The comparator 19 will produce the first output signal when the pressure in the passageway 14 rises to such an extent as to be equal to the pressure P1. At this time the reference unit 21 will close the valve 13.

Alternatively, the valve 13 may connect the source 12 to the passageway 14 for a length of time such that the pressure in the passageway 14 is allowed to rise to substantially the pressure of the source 12, which is higher than the pressure P1 or at least exceed the pressure P1. Then, the valve 13 will be closed to disconnect the source 12 from the passageway 14. The pressure in the passageway 14 will progressively drop due to leakage from the passageway 14 and/or injector 15. In this case, the comparator 19 will produce the first output signal when the pressure in the passageway 14 has dropped to the pressure P1. In either case, the comparator 19 will produce the first output signal when the pressure in the passageway 14 is equal to P1 and the valve 13 disconnects the source 12 from the passageway 14.

The reference unit 21 initially produces a first reference digital signal corresponding to the pressure P1 and applies the first reference signal to the comparator 19 for comparison with the sensor signal. This allows the comparator 19 to produce the first output signal when the pressure in the passageway 14 equals the pressure P1. In response to the first output signal from the comparator 19, the reference unit 21 produces a second reference digital signal and applies the same to the comparator 19. The second reference digital signal corresponds to a lower predetermined pressure P2.

After the valve 13 disconnects the source 12 from the passageway 14, the pressure in the passageway 14 will progressively drop due to leakage therefrom. The higher the degree of leakage, the faster the pressure in the passageway 14 will drop. When the pressure in the passageway 14 drops down to the pressure P2, the comparator 19 will produce the second output signal. The timer 22 is constructed to measure the length of time between generation of the first and second output signals by the comparator 19. This time corresponds to the degree of leakage from the passageway 14. The higher the degree of leakage, the shorter the measured time for the pressure in the passageway 14 to drop from the pressure P1 to the pressure P2. The timer 22 is further constructed to compare the measured length of time with a predetermined length of time. The predetermined length of time corresponds to the borderline between tolerable and excessive leakage. If the measured length of time is less than the predetermined length of time, the leakage is excessive. If the measured length of time is greater than the predetermined length of time, the leakage is tolerable.

The timer 22 actuates the display unit 23 in accordance with the measured length of time. The display unit 23 may comprise one or two lamps (not shown). In the case of one lamp, the lamp may be lit when the amount of leakage is tolerable. Alternatively, the lamp may be lit when the degree of leakage is excessive. In the case of two lamps, one lamp may be lit when the degree of leakage is tolerable, and the other lamp may be lit when the degree of leakage is excessive.

The display 23 may also comprise means for displaying the measured length of time or a value corresponding thereto. The display unit 23 may display the measured value under all conditions, only when the leakage is tolerable or only when the leakage is excessive as required by the particular application.

The display unit 23 produces an alarm signal when the degree of leakage is excessive. The alarm signal energizes the alarm 24 which may be a buzzer, bell, flashing light, siren or horn. The output of the display unit 23 and/or timer 22 may be fed to a remote control panel, recorder, digital data collection system or the like if desired.

Figure 2:
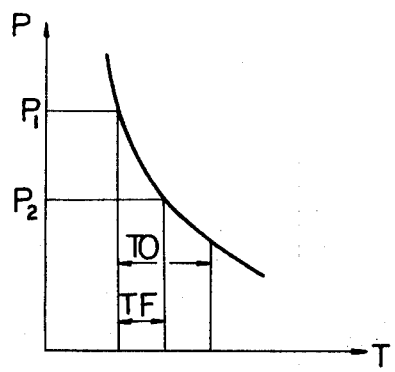
FIGS. 2 to 4 are graphs illustrating the operation of the present apparatus.
Figure 3:
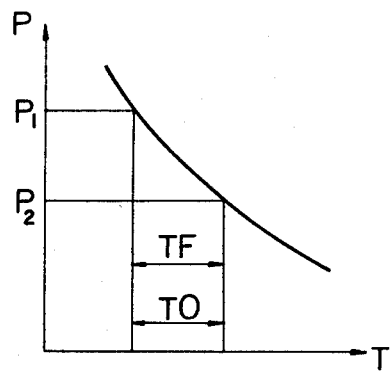
Figure 4:
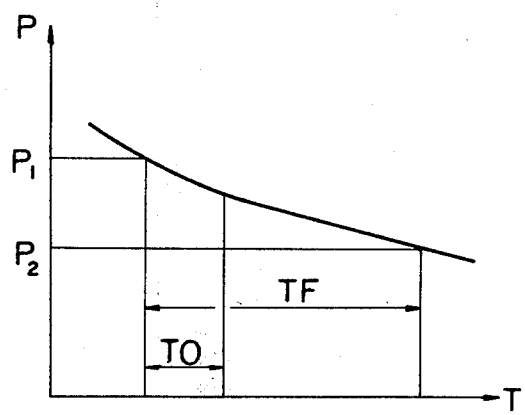

The timer 22 functions to compare the measured length of time, designated as TF, with the predetermined length of time which is designated as TO. FIG. 3 shows a borderline case in which TF=TO, indicating that the degree of leakage is on the borderline of tolerability. In FIG. 2, TF is less than TO, indicating that the degree of leakage is excessive. In FIG. 4, TF is greater than TO, indicating that the degree of leakage is tolerable. In FIGS. 2 to 4, the abscissa axis represents elapsed time T whereas the ordinate axis represents pressure P in the passageway 14.

Figure 5:
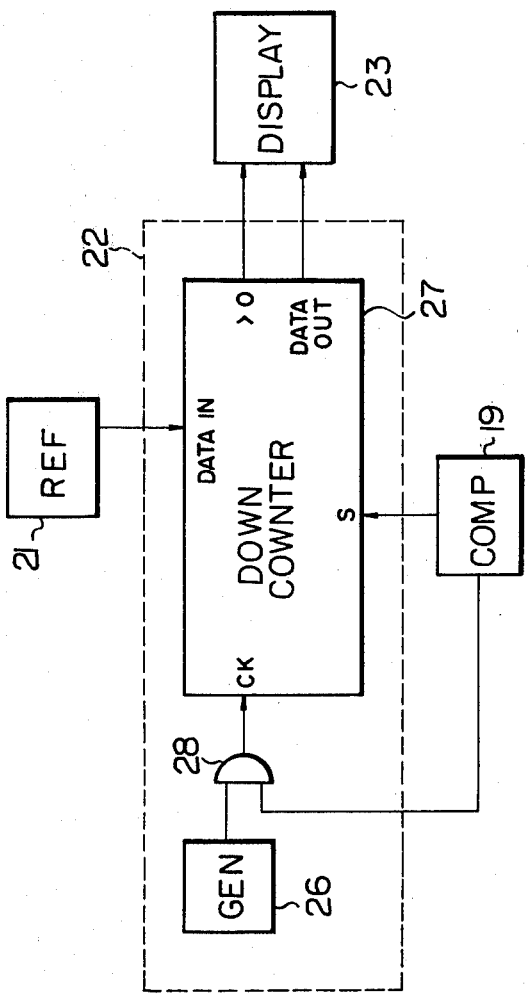
FIG. 5 is a more detailed block diagram of an essential part of the present apparatus.

A preferred embodiment of the timer 22 is illustrated in FIG. 5. The timer 22 comprises a clock pulse generator 26 which feeds clock pulses to a clock input CK of a digital down counter 27 through an AND gate 28. The reference unit 21 applies a digital signal corresponding to the predetermined length of time TO to a data input of the counter 27. The first output signal of the comparator 19 is applied to a set input S of the counter 27. This causes the signal corresponding to the time TO to be set into the counter 27, and the counter 27 counts down in response to the clock pulses. The comparator 19 has an output connected to an input of the AND gate 28 to enable the AND gate 28 as long as the pressure in the passageway 14 is above the pressure P2. The AND gate 28 is inhibited when the second output signal is generated by the comparator 19. The counter 27 is constructed to count down to zero and stop.

In response to the first output signal from the comparator 19, the signal corresponding to the time TO is set into the counter 27 and the counter 27 starts counting down. If the count in the counter 27 reaches zero before the comparator 19 produces the second output signal, the count in the counter 27 will remain at zero. However, if the comparator 19 produces the second output signal before the counter 27 is decremented to zero, the comparator 19 will inhibit the AND gate 28 preventing further clock pulses from being applied to the counter 27. This stops the counter 27 at the count which was attained when the comparator 19 produced the second output signal. Thus, the count in the counter 27 will be zero when the degree of leakage is tolerable and will be non-zero when the degree of leakage is tolerable.

The counter 27 is provided with an output >0 which is logically high when the count in the counter 27 is greater than zero and is low when the count in the counter 27 is zero. Thus, when the output >0 is high, the degree of leakage is tolerable, and vice-versa.

The count in the counter 27 may also be applied from a data output of the counter 27 to the display unit 23. Based on the logical sense of the >0 output, the display unit 23 may display the count in the counter 27 which corresponds to the measured length of time TF when the degree of leakage is either excessive or tolerable as desired. The timer 22 may be adapted to count below zero so as to indicate the count whether the degree of leakage is tolerable or excessive as required in a particular application.

In summary, it will be seen that the present invention provides a reliable and accurate apparatus for measuring the degree of leakage from any type of fluid passageway. Various modifications will become possible for those skilled in the art after receiving the teachings of the present disclosure without departing from the scope thereof.

What is claimed is:

1. An apparatus for measuring a degree of leakage from a fluid passageway, comprising:
    pressure sensor means connected to the passageway for producing an electric sensor signal corresponding to fluid pressure in the passageway;
    pressure source means for applying fluid pressure of at least an upper predetermined value to the passageway;
    valve means for disconnecting the source from the passageway when the pressure in the passageway is at least equal to the upper predetermined value;
    comparator means responsive to the sensor means for comparing the sensor signal with first and second reference signals corresponding to the upper predetermined value of pressure and a lower predetermined value of pressure and producing first and second output signals respectively in response to coincidence thereof; and
    timer means for measuring a length of time between generation of the first and second output signals by the comparator means.

2. An apparatus as in claim 1, in which the sensor means comprises a sensor for producing an electric current corresponding to fluid pressure in the passageway and a current to voltage converter for converting the electric current into an electric voltage.

3. An apparatus as in claim 1, in which the timer means is constructed to compare the measured length of time with a predetermined length of time and produce an alarm signal when the measured length of time is shorter than the predetermined length of time.

4. An apparatus as in claim 3, further comprising alarm means which is energized by the alarm signal.

5. An apparatus as in claim 1, further comprising display means for displaying the measured length of time.

6. An apparatus as in claim 5, in which the display means is constructed to display the measured length of time only when the measured length of time is shorter than a predetermined length of time.

7. An apparatus as in claim 5, in which the display means is constructed to display the measured length of time only when the measured length of time is longer than a predetermined length of time.

8. An apparatus as in claim 1, further comprising control means responsive to the comparator means for initially controlling the valve means to connect the source to the passageway and for controlling the valve means to disconnect the source from the passageway when the pressure in the passageway reaches the upper predetermined value and the comparator means produces the first output signal.

9. An apparatus as in claim 1, further comprising control means responsive to the comparator means for initially controlling the valve means to connect the source to the passageway for a length of time sufficient for the pressure in the passageway to exceed the upper predetermined value and then controlling the valve means to disconnect the source from the passageway.

10. An apparatus for measuring a degree of leakage from a fluid passageway, comprising:
    pressure sensor means connected to the passageway for producing an electric sensor signal corresponding to fluid pressure in the passageway;
    pressure source means for applying fluid pressure of at least an upper predetermined value to the passageway;
    valve means for disconnecting the source from the passageway when the pressure in the passageway is at least equal to the upper predetermined value;
    comparator means responsive to the sensor means for comparing the sensor signal with first and second reference signal corresponding to the upper predetermined value of pressure and a lower predetermined value of pressure and producing first and second output signals respectively in response to coincidence thereof; and
    timer means for measuring a length of time between generation of the first and second output signals by the comparator means;
    the timer means comprising a down counter, means for setting a predetermined number into the counter in response to the first output signal, clock pulse generator means for generating clock pulses, gate means connected between the clock pulse generator means and a clock input of the counter and means responsive to the first and second output signals for enabling the gate means only for the length of time between generation of the first and second output signals.

11. An apparatus as in claim 10 further comprising alarm means for producing an alarm indication when a count in the counter is greater than zero after generation of the second output signal.

12. An apparatus for measuring a degree of leakage from a fluid passageway, comprising:
    pressure sensor means connected to the passageway for producing an electric sensor signal corresponding to fluid pressure in the passageway;

pressure source means for applying fluid pressure of at least an upper predetermined value to the passageway;

valve means for disconnecting the source from the passageway when the pressure in the passageway is at least equal to the upper predetermined value;

comparator means responsive to the sensor means for comparing the sensor signal with first and second reference signals corresponding to the upper predetermined value of pressure and a lower predetermined value of pressure and producing first and second output signals respectively in response to coincidence thereof; and timer means for measuring a length of time between generation of the first and second output signals by the comparator means;

the sensor means comprising a sensor for producing an electric current corresponding to fluid pressure in the passageway and a current to voltage converter for converting the electric current into an electric voltage;

the sensor means further comprising an analog to digital converter for converting the electric voltage into a digital signal, the digital signal constituting the sensor signal.

* * * * *